(12) United States Patent
Kuwabara et al.

(10) Patent No.: US 11,345,430 B2
(45) Date of Patent: May 31, 2022

(54) FRONT FORK LOWER PORTION STRUCTURE OF SADDLE RIDING VEHICLE

(71) Applicants: HONDA MOTOR CO., LTD., Tokyo (JP); ÖHLINS RACING AB, Upplands Väsby (SE)

(72) Inventors: Naoki Kuwabara, Tokyo (JP); Yusuke Hayashi, Tokyo (JP); Mikael Jonsson, Upplands Väsby (SE)

(73) Assignees: HONDA MOTOR CO., LTD., Tokyo (JP); ÖHLINS RACING AB, Upplands Väsby (SE)

( * ) Notice: Subject to any disclaimer, the term of this patent is extended or adjusted under 35 U.S.C. 154(b) by 169 days.

(21) Appl. No.: 16/908,958

(22) Filed: Jun. 23, 2020

(65) Prior Publication Data
US 2020/0407006 A1 Dec. 31, 2020

(30) Foreign Application Priority Data
Jun. 27, 2019 (JP) .............................. JP2019-120402

(51) Int. Cl.
| | |
|---|---|
| *B62K 21/02* | (2006.01) |
| *B62K 19/38* | (2006.01) |
| *B62J 45/412* | (2020.01) |
| *B62J 45/423* | (2020.01) |
| *B62K 25/08* | (2006.01) |
| *B62K 21/08* | (2006.01) |

(52) U.S. Cl.
CPC ............. *B62K 21/02* (2013.01); *B62J 45/412* (2020.02); *B62J 45/423* (2020.02); *B62K 19/38* (2013.01); *B62K 21/08* (2013.01); *B62K 25/08* (2013.01)

(58) Field of Classification Search
CPC ........ B62K 21/02; B62J 45/412; B62J 45/423
USPC .......................................................... 280/276
See application file for complete search history.

(56) References Cited

U.S. PATENT DOCUMENTS

| | | | |
|---|---|---|---|
| 7,901,013 B2* | 3/2011 | Ishida ..................... | B60T 8/329 |
| | | | 324/173 |
| 9,539,857 B2* | 1/2017 | Sagane ............... | B60B 27/0068 |
| (Continued) | | | |

FOREIGN PATENT DOCUMENTS

| | | |
|---|---|---|
| JP | 2005-271666 | 10/2005 |
| WO | 2018/083644 A1 | 5/2018 |
| (Continued) | | |

OTHER PUBLICATIONS

Japanese Office Action dated Jun. 29, 2021, English translation included, 7 pages.
German Office Action with English translation, 7 pages.

*Primary Examiner* — Kevin Hurley
*Assistant Examiner* — Hosam Shabara
(74) *Attorney, Agent, or Firm* — Rankin, Hill & Clark LLP

(57) ABSTRACT

A front fork, which suspends a front wheel is a compression type and includes a pressure tank at a lower end portion thereof. The front fork includes, at the lower end portion, a caliper bracket which supports a brake caliper which constitutes a disc brake and a sensor mounting portion on which a wheel speed sensor is mounted. The caliper bracket includes a pair of an upper caliper support portion and a lower caliper support portion. In a vehicle side view, the pressure tank is disposed between the upper caliper support portion and the lower caliper support portion, and the sensor mounting portion is disposed inferior to or superior to the pressure tank.

10 Claims, 9 Drawing Sheets

(56) References Cited

U.S. PATENT DOCUMENTS

| | | | | |
|---|---|---|---|---|
| 10,940,839 B2* | 3/2021 | Soatti | ............... | B60T 8/329 |
| 2005/0247499 A1* | 11/2005 | Toyoda | ............ | B62J 45/412 |
| | | | | 180/219 |
| 2019/0329747 A1 | 10/2019 | Soatti et al. | | |

FOREIGN PATENT DOCUMENTS

| | | |
|---|---|---|
| WO | 2018/220202 | 12/2018 |
| WO | 2019/064902 | 4/2019 |

\* cited by examiner

FRONT FORK LOWER PORTION STRUCTURE OF SADDLE RIDING VEHICLE

INCORPORATION BY REFERENCE

The present application claims priority under 35 U.S.C. § 119 to Japanese Patent Application No. 2019-120402 filed on Jun. 27, 2019. The content of the application is incorporated herein by reference in its entirety.

TECHNICAL FIELD

The present invention relates to a front fork lower portion structure of a saddle riding vehicle.

BACKGROUND ART

A hitherto known vehicle includes a caliper bracket integrated with a lower end portion of a front fork and a wheel speed sensor disposed at a lower end of the caliper bracket (see, for example, Patent Document 1).

PRIOR ART DOCUMENT

Patent Document

[Patent Document 1]
Japanese Patent Laid-open No. 2005-271666

SUMMARY OF THE INVENTION

Problem to be Solved by the Invention

In the configuration disclosed in Patent Document 1, the wheel speed sensor protrudes inferiorly from a lower edge of the caliper bracket and is thus exposed on the outside. With a compression type front fork, when a pressure tank is disposed at a lower end portion of the front fork, it is desirable that the caliper bracket, the wheel speed sensor, and the pressure tank are compactly disposed.

An object of the present invention is to provide a front fork lower portion structure of a saddle riding vehicle, the front fork lower portion structure enabling a pressure tank and a wheel speed sensor to be compactly disposed without being exposed on an outside, to thereby improve appearance.

Means for Solving the Problem

To achieve the foregoing object, an aspect of the present invention provides a front fork lower portion structure of a saddle riding vehicle, the saddle riding vehicle including a front fork (12) of a compression type for suspending a front wheel (2), the front fork lower portion structure including: a pressure tank (66k) included in the front fork (12); a caliper bracket (66a), disposed at a lower end portion of the front fork (12), for supporting a caliper (69) that constitutes a disc brake (67); and a sensor mounting portion (66r) that is disposed at the lower end portion of the front fork (12) and to which a wheel speed sensor (85) is mounted, in which the caliper bracket (66a) includes a pair of upper and lower caliper support portions (66g and 66h), the pressure tank (66k) is disposed between the upper and lower caliper support portions (66g and 66h) in a vehicle side view, and the sensor mounting portion (66r) is disposed inferior to or superior to the pressure tank (66k).

In the foregoing configuration, preferably, the caliper bracket (66a) is integrally formed with an axle support portion (66c) that supports an axle (2a) of the front wheel (2), the caliper bracket (66a) includes a base portion (66j) that extends from the axle support portion (66c) and the upper and lower caliper support portions (66g and 66h) that extend from an upper end portion and a lower end portion, respectively, of the base portion (66j), and the pressure tank (66k) and the sensor mounting portion (66r) are disposed integrally with the base portion (66j).

In the foregoing configuration, preferably, the sensor mounting portion (66r) is formed on a surface (66p) of the base portion (66j) on an inside in a vehicle width direction.

In the foregoing configuration, preferably, the pressure tank (66k) forms a cylindrical shape protruding from the base portion (66j) outside in the vehicle width direction.

In the foregoing configuration, preferably, the wheel speed sensor (85) is disposed inferior to the pressure tank (66k) in the vehicle side view.

In the foregoing configuration, preferably, the wheel speed sensor (85) is mounted to the sensor mounting portion (66r) together with a protection member (86) that protects the wheel speed sensor (85).

In the foregoing configuration, preferably, the base portion (66j) extends from the axle support portion (66c) posteriorly in a vehicle body, the base portion (66j) has a pair of left and right protrusions (66z) at a lower end portion thereof, the protrusions (66z) forming a triangular shape in a bottom view, the wheel speed sensor (85) protrudes further toward the inside in the vehicle width direction relative to a width of the protrusions (66z) in the bottom view, and the protection member (86) has a lower extension (86e) that extends along an inclination of a side edge (66t) of the protrusion (66z) at a position inferior to the wheel speed sensor (85).

In the foregoing configuration, preferably, the wheel speed sensor (85) is disposed posterior to the axle (2a) of the front wheel (2) in the vehicle side view.

In the foregoing configuration, preferably, the wheel speed sensor (85) includes a detector (85b) that is covered in a tubular portion (86b) of the protection member (86) that protects the wheel speed sensor (85).

In the foregoing configuration, preferably, a fastening member (87) is disposed anterior to the detector (85b) of the wheel speed sensor (85), the fastening member (87) fixing the wheel speed sensor (85) to the sensor mounting portion (66r).

Effects of the Invention

In the front fork lower portion structure of a saddle riding vehicle, the caliper bracket includes a pair of upper and lower caliper support portions and, in the vehicle side view, the pressure tank is disposed between the upper and lower caliper support portions, and the sensor mounting portion is disposed inferior to or superior to the pressure tank. Through the foregoing configuration, the space between the upper and lower caliper support portions can effectively be utilized to compactly dispose the pressure tank and the wheel speed sensor and to improve appearance.

In the foregoing configuration, the caliper bracket is integrally formed with the axle support portion that supports the axle of the front wheel. Additionally, the caliper bracket includes the base portion that extends from the axle support portion and the pair of the upper and the lower caliper support portion that extend from the upper end portion and the lower end portion, respectively, of the base portion. The pressure tank and the sensor mounting portion are disposed integrally with the base portion. Through the foregoing configuration, the caliper bracket is integrated with the pressure tank and the sensor mounting portion is centralized, so that a compact layout can be achieved. Additionally, the neat and tidy layout improves appearance, compared with a configuration in which the caliper bracket is separated from the pressure tank.

In the foregoing configuration, the sensor mounting portion is formed on the surface of the base portion on the inside in the vehicle width direction. Thus, the wheel speed sensor is not exposed on the outside, so that appearance can improved.

In the foregoing configuration, the pressure tank forms the cylindrical shape protruding from the base portion to the outside in the vehicle width direction. Thus, the pressure tank does not protrude to the inside in the vehicle width direction from the base portion, so that the space inside the base portion in the vehicle width direction can be secured and the wheel speed sensor can be easily disposed.

In the foregoing configuration, the wheel speed sensor is disposed inferior to the pressure tank in the vehicle side view. Thus, maintenance can be easily performed for the wheel speed sensor through access from below the lower caliper support portion.

In the foregoing configuration, the wheel speed sensor is mounted to the sensor mounting portion together with the protection member that protects the wheel speed sensor. Thus, the wheel speed sensor can be protected by a simple structure and the wheel speed sensor can be protected from chipping and other disturbances.

In the foregoing configuration, the base portion extends from the axle support portion posteriorly in the vehicle body, and the base portion has the pair of left and right protrusions at a lower end portion thereof, the protrusions forming a triangular shape in a bottom view. The wheel speed sensor protrudes further toward the inside in the vehicle width direction relative to the width of the protrusions in the bottom view. The protection member has the lower extension that extends along the inclination of the side edge of the protrusions at a position inferior to the wheel speed sensor. The provision of the protrusions enables strength of the base portion to be enhanced. Additionally, the protrusions that are shaped into a triangle reduce a volume of the protrusions, so that an increase in weight can be reduced. Furthermore, the protection member covers a protruding portion of the wheel speed sensor, so that the wheel speed sensor can be protected.

In the foregoing configuration, the wheel speed sensor is disposed posterior to the axle of the front wheel in the vehicle side view. Thus, the wheel speed sensor can be protected from the front by the axle and parts around the axle.

In the foregoing configuration, the detector of the wheel speed sensor is covered in the tubular portion disposed in the protection member that protects the wheel speed sensor. Thus, the detector of the wheel speed sensor can be protected by the tubular portion of the protection member.

In the foregoing configuration, the fastening member for fixing the wheel speed sensor to the sensor mounting portion is disposed anterior to the detector of the wheel speed sensor. The detector of the wheel speed sensor can be protected from the front by the fastening member.

MODE FOR CARRYING OUT THE INVENTION

Figure 1:
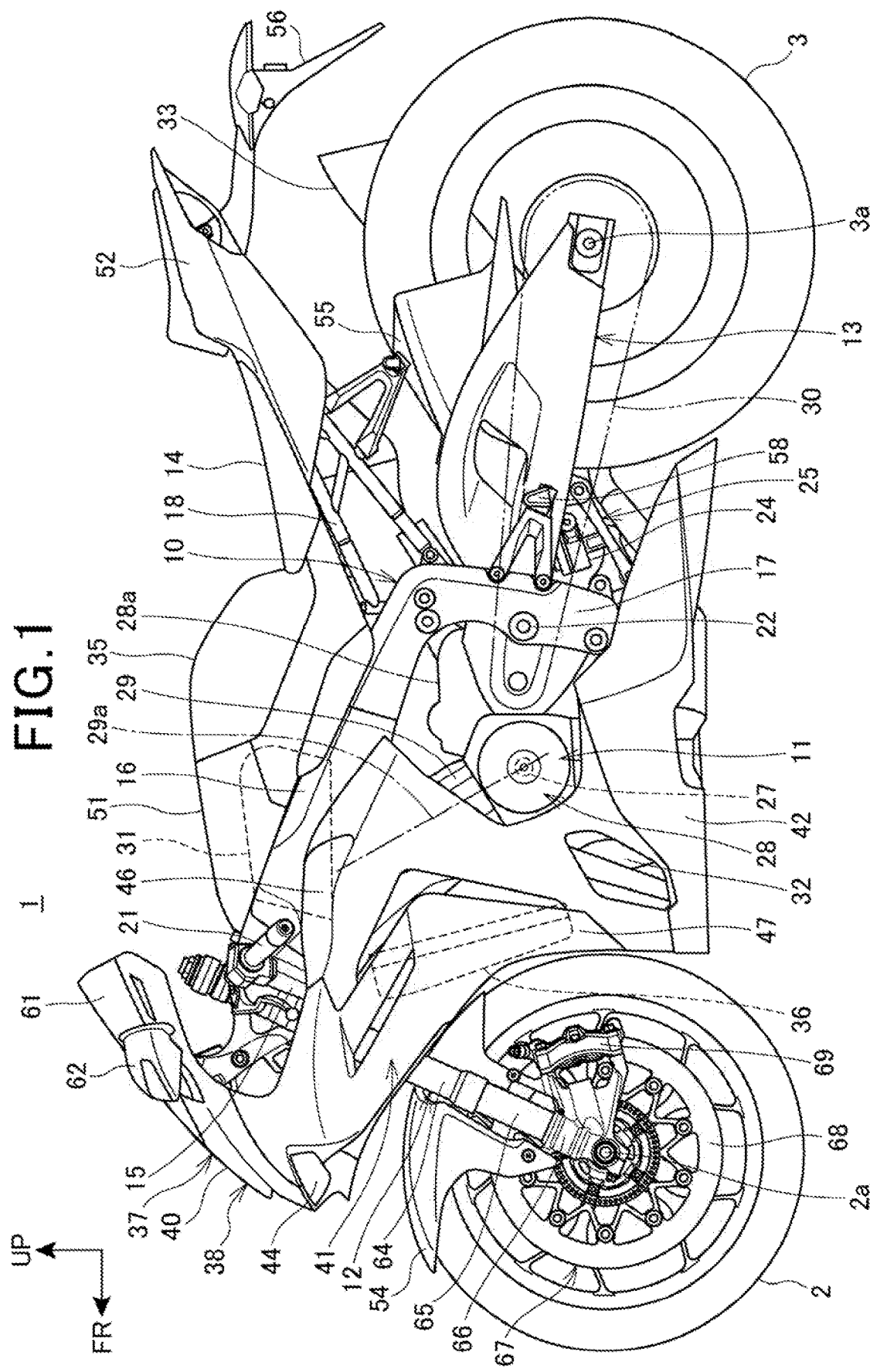
FIG. 1 is a left side elevational view of a motorcycle including a front fork lower portion structure according to an embodiment of the present invention.

A specific embodiment to which the present invention is applied will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a left side elevational view of a motorcycle 1 which includes a front fork lower portion structure according to the embodiment of the present invention.

The motorcycle 1 includes an engine 11, a front fork 12, and a swing arm 13. The engine 11 as a power unit is supported on a vehicle body frame 10. The front fork 12, which supports a front wheel 2, is steerably supported at a front end of the vehicle body frame 10. The swing arm 13, which supports a rear wheel 3, is disposed at a rear portion of the vehicle body frame 10.

The motorcycle 1 is a saddle riding vehicle in which an occupant straddles a seat 14. The seat 14 is disposed superior to the rear portion of the vehicle body frame 10.

The vehicle body frame 10 includes a head pipe 15, a pair of left and right main frames 16, a pair of left and right pivot frames 17, and a pair of left and right seat frames 18. The head pipe 15 constitutes a front end portion of the vehicle body frame 10. The main frames 16 extend from the head pipe 15 downwardly toward the rear. The pivot frames 17 extend from rear ends of the main frames 16 downwardly. The seat frames 18 extend from the main frames 16 and the pivot frames 17 upwardly toward the rear.

The main frames 16 include an engine hanger (not depicted) that extends from front portions of the main frames 16 downwardly to thereby support the engine 11.

The front fork 12 is journaled steerably to the left and right by the head pipe 15. A steering handlebar 21 is disposed at an upper end portion of the front fork 12. The front wheel 2 is journaled by an axle 2a. The axle 2a is disposed at a lower end portion of the front fork 12.

The swing arm 13 is journaled by a pivot shaft 22. The pivot shaft 22 is supported by the left and right pivot frames 17. The pivot shaft 22 extends horizontally in a vehicle width direction. The swing arm 13 has a front end portion journaled by the pivot shaft 22 and oscillates vertically about the pivot shaft 22.

The rear wheel 3 is journaled by an axle 3a. The axle 3a is disposed at a rear end portion of the swing arm 13.

A rear suspension 24 is disposed across a vehicle body and the swing arm 13. The rear suspension 24 has an upper end connected with the vehicle body. The upper end of the rear suspension 24 is connected, for example, with the engine 11 as the vehicle body via a suspension connection portion (not depicted) that extends from a rear end portion of the engine 11 toward the rear.

The rear suspension 24 has a lower end connected with the swing arm 13 and lower end portions of the pivot frames 17 via a link mechanism 25.

The engine 11 is disposed inferior to the main frames 16 and anterior to the pivot frames 17 and fixed to the vehicle body frame 10.

The engine 11 includes a crankcase 28 and a cylinder portion 29. The crankcase 28 supports a crankshaft 27. The crankshaft 27 extends horizontally in the vehicle width direction. The cylinder portion 29 extends from a front portion of the cylinder portion 29 upwardly toward the front. A piston (not depicted) that makes a reciprocating motion in the cylinder portion 29 is housed in the cylinder portion 29. The cylinder portion 29 has a cylinder axis 29a inclined forwardly relative to a vertical.

A rear portion of the crankcase 28 constitutes a transmission case portion 28a in which a transmission (not depicted) is housed. An output from the engine 11 is transmitted to the rear wheel 3 via a drive chain 30. The drive chain 30 connects an output shaft of the transmission with the rear wheel 3.

An air cleaner box 31 is disposed posterior to and superior to the cylinder portion 29. The air cleaner box 31 is connected with an intake port in a rear surface of the cylinder portion 29 via a throttle body (not depicted).

An exhaust pipe 32 of the engine 11 extends downwardly from an exhaust port in a front surface of the cylinder portion 29 and further extends along a path inferior to the engine 11 toward the rear. The exhaust pipe 32 has a rear end connected with a muffler 33. The muffler 33 is disposed beside the rear wheel 3.

A fuel tank 35 is disposed superior to the main frames 16 and between the seat 14 and the air cleaner box 31.

A radiator 36 which cools the engine 11 is disposed anterior to the engine 11.

The motorcycle 1 includes a vehicle body cover 37. The vehicle body cover 37 covers the vehicle body including the vehicle body frame 10, the engine 11, and the like.

The vehicle body cover 37 includes a cowl 38 at a front portion thereof.

The cowl 38 includes a front cowl 40, a middle cowl 41, and an under cowl 42.

The front cowl 40 covers an upper portion of the front fork 12 and the head pipe 15 from the front and covers areas around a pair of left and right headlights 44. The middle cowl 41 includes a pair of left and right main cowls 46 and a pair of left and right outer cowls 47. The main cowls 46 cover a front portion of the engine 11 from sides. The outer cowls 47 are disposed laterally outside the respective main cowls 46 in the vehicle width direction. The under cowl 42 covers the engine 11 from below.

The vehicle body cover 37 includes a tank cover 51 and a rear cover 52. The tank cover 51 covers the air cleaner box 31 and a part of the fuel tank 35. The rear cover 52 covers a rear portion of the vehicle body.

A front fender 54 which covers the front wheel 2 from above is mounted on the front fork 12. An inner fender 55 which covers a front portion of the rear wheel 3 from above is mounted on the swing arm 13. A rear fender 56 which covers a rear portion of the rear wheel 3 from the rear extends from rear end portions of the seat frames 18 downwardly toward the rear.

A step 58 on which the occupant rests his or her foot is supported by the pivot frame 17 and disposed posterior to the pivot frame 17.

A windscreen 61 and a pair of left and right rearview mirrors 62 are disposed above the front cowl 40. The windscreen 61 is disposed at a central portion. The rearview mirrors 62 are disposed on respective lateral sides of the windscreen 61 in the vehicle width direction.

Figure 2:
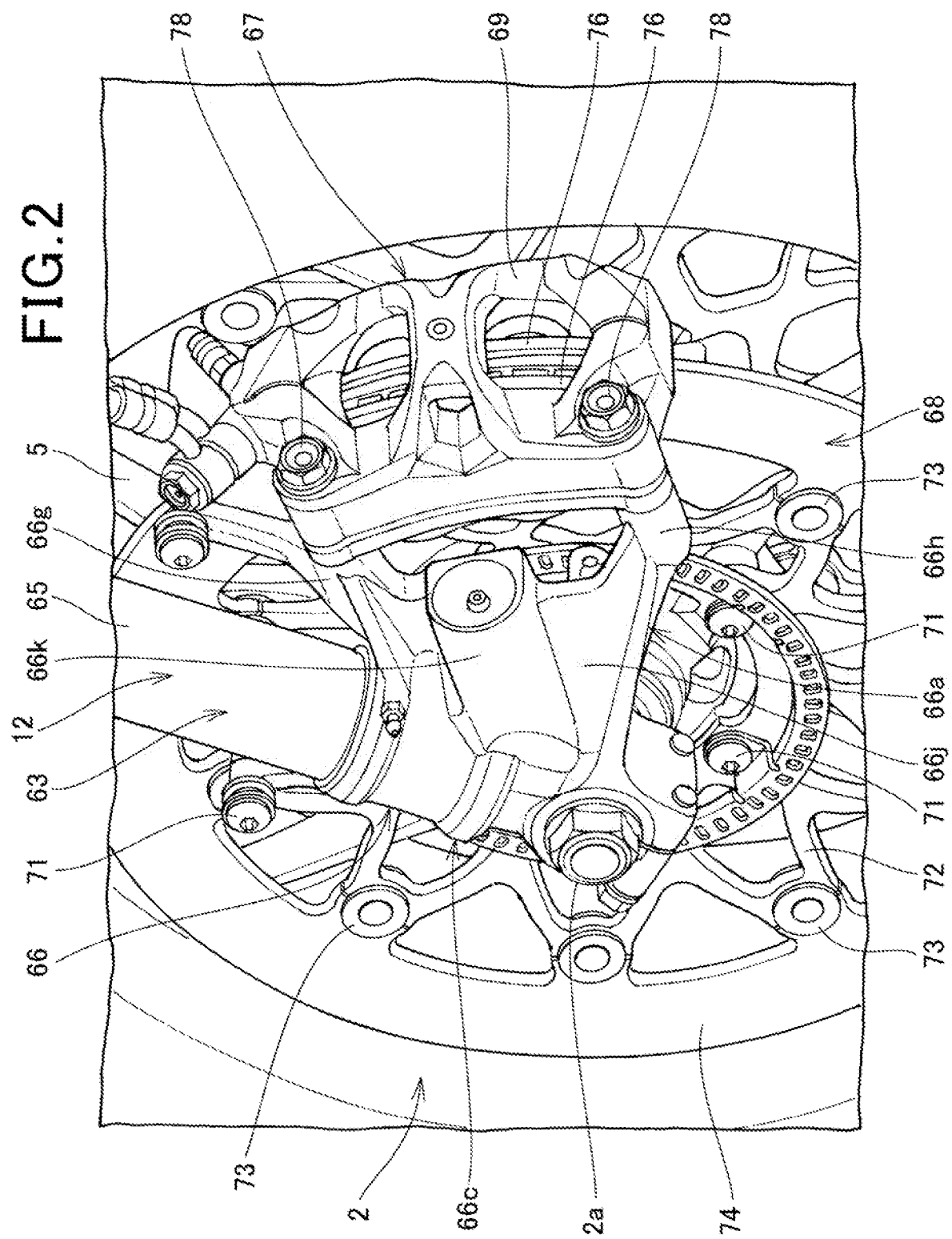
FIG. 2 is a perspective view of a lower portion of a front fork and parts therearound.

FIG. 2 is a perspective view of a lower portion of the front fork 12 and parts therearound.

In FIGS. 1 and 2, the front fork 12 is provided with a pair of left and right fork tubes 63 as shock absorbers.

The fork tubes 63 each include an upper tube 64, a lower tube 65, and an axle support member 66. The upper tube 64 constitutes an upper portion of the fork tube 63. The lower tube 65 slidably fits in an inside of the upper tube 64. The axle support member 66 is fixed to a lower end portion of the lower tube 65. The lower tube 65 constitutes a lower portion of the fork tube 63.

A disc brake 67 which brakes the front wheel 2 includes a brake disc 68 and a brake caliper 69. The brake disc 68 is mounted on the front wheel 2 (more specifically, a wheel 5 which constitutes the front wheel 2). The brake caliper 69 clamps the brake disc 68 to thereby effect braking.

The brake disc 68 includes a disc main body support portion 72 and a disc main body 74. The disc main body support portion 72 is mounted on the wheel 5 with a plurality of bolts 71. The disc main body 74 has a disc shape and is coupled to an outer peripheral portion of the disc main body support portion 72 with a plurality of coupling members 73.

A pair of brake pads 76 is provided as an adjunct inside the brake caliper 69. The brake pads 76 clamp and press the brake disc 68. The brake pads 76 are pressed against the brake disc 68 by a pressing force of a piston (not depicted) provided in the brake caliper 69.

The disc main body 74 represents a portion clamped by the brake pads 76.

The axle support member 66 is provided integrally with a caliper bracket 66a. The caliper bracket 66a is disposed at a rear portion of the axle support member 66 and supports the brake caliper 69.

The brake caliper 69 is fastened to the caliper bracket 66a with a pair of bolts 78.

Figure 3:
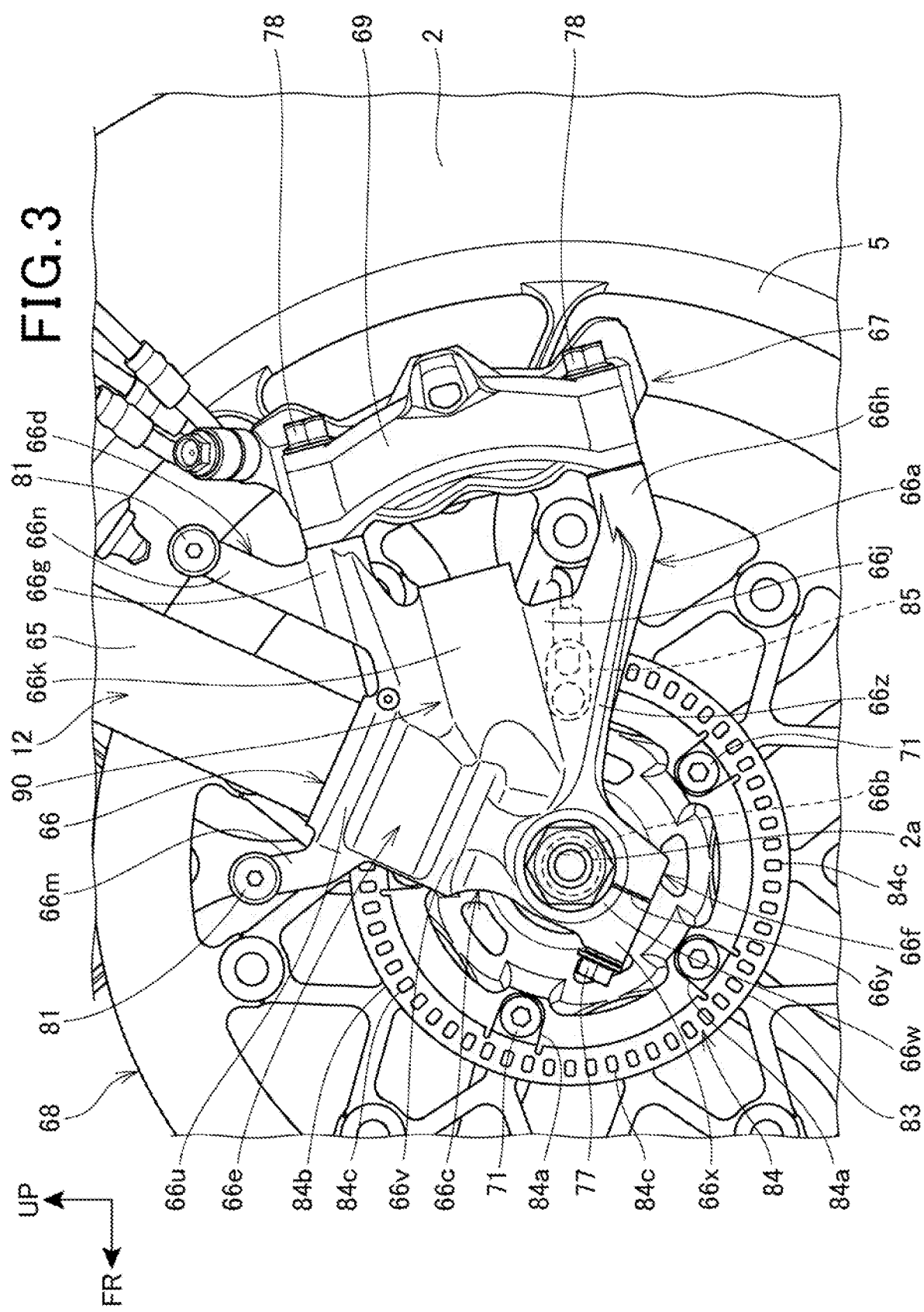
FIG. 3 is a left side elevational view of the lower portion of the front fork and parts therearound.

FIG. 3 is a left side elevational view of the lower portion of the front fork 12 and parts therearound.

The axle support member 66 integrally includes the caliper bracket 66a, an axle support portion 66c, and a fender support portion 66d.

The axle support portion 66c includes a fork lower end fit portion 66e and a shaft support main unit portion 66f. The fork lower end fit portion 66e is formed into a tubular shape and fits in a lower end portion of the lower tube 65. The shaft support main unit portion 66f is integrally formed with a lower portion of the fork lower end fit portion 66e.

The fork lower end fit portion 66e includes an upper annular protrusion 66u and a lower annular protrusion 66v. The upper annular protrusion 66u and the lower annular protrusion 66v protrude annularly to the outside in a radial direction on outer peripheral surfaces at an upper end portion and a lower end portion, respectively, of the fork lower end fit portion 66e, to thereby serve as reinforcement portions.

The shaft support main unit portion 66f has an axle pass-through hole 66b formed therein. The axle 2a is passed through the axle pass-through hole 66*b*. An edge portion of the axle pass-through hole 66*b* includes a pair of annular lateral protrusions 66*w* (FIG. 3 depicts only the annular lateral protrusion 66*w* on the side closer to the viewer). The annular lateral protrusions 66*w* protrude annularly to respective lateral sides in the vehicle width direction. The shaft support main unit portion 66*f* includes a pair of left and right bolt pass-through portions 66*x* at a lower end portion thereof. The bolt pass-through portions 66*x* are formed to be inclined upwardly toward the front. Bolts 77 are passed through bolt holes in the respective bolt pass-through portions 66*x*.

The annular lateral protrusions 66*w* and the bolt pass-through portions 66*x* are each divided into two by a slit 66*y*, which extend from the axle pass-through hole 66*b* downwardly and obliquely toward the front.

The caliper bracket 66*a* extends integrally from the axle support portion 66*c* toward the rear. The caliper bracket 66*a* includes an upper caliper support portion 66*g*, a lower caliper support portion 66*h*, and an intermediate wall portion 66*j*. The upper caliper support portion 66*g* is formed at an upper end portion of the caliper bracket 66*a*. The lower caliper support portion 66*h* is formed at a lower end portion of the caliper bracket 66*a*. The intermediate wall portion 66*j* connects between the upper caliper support portion 66*g* and the lower caliper support portion 66*h*.

The brake caliper 69 is mounted on the upper caliper support portion 66*g* and the lower caliper support portion 66*h* with the bolts 78.

A pressure tank 66*k* is disposed at the intermediate wall portion 66*j*. The pressure tank 66*k* has a cylindrical shape protruding laterally. The pressure tank 66*k* extends from a side of the axle support portion 66*c* obliquely upwardly toward the rear.

A cylinder hole is formed inside the pressure tank 66*k*. A free piston is placed slidably in the cylinder hole, so that a gas chamber and an oil chamber are defined in the cylinder hole.

The gas chamber as a closed space is filled with pressurized gas, and the oil chamber communicates with an oil chamber inside the front fork 12. The foregoing configuration results in a hydraulic fluid filling the oil chamber inside the front fork 12 being at all times maintained at positive pressure by pressure of the pressurized gas in the gas chamber. As a result, cavitation is not likely to occur in the hydraulic fluid in the oil chamber inside the front fork 12, so that a steady damping force can be generated.

A pair of left and right lower end portion lateral protrusions 66*z*, each protruding laterally, extends from the respective shaft support main unit portions 66*f* to respective lateral surfaces of lower end portions of the caliper brackets 66*a*.

The fender support portion 66*d*, which supports the front fender 54 is disposed at an upper end portion of each of the caliper bracket 66*a* and the axle support portion 66*c*.

The fender support portion 66*d* includes a front support portion 66*m* and a rear support portion 66*n*. The front support portion 66*m* extends from a front upper portion of the axle support portion 66*c* (specifically, the fork lower end fit portion 66*e*) upwardly. The rear support portion 66*n* extends from the caliper bracket 66*a* (specifically, the upper caliper support portion 66*g*) upwardly. The front fender 54 (see FIG. 1) is mounted with screws 81 at upper end portions of the front support portion 66*m* and the rear support portion 66*n*.

A wheel speed detection device 83 which detects a rotational speed of the front wheel 2 is disposed at a position around the front wheel 2. The wheel speed detection device 83 includes an annular pulsar rotor 84 and a wheel speed sensor 85. The pulsar rotor 84 is mounted on the front wheel 2, or more specifically, the wheel 5. The wheel speed sensor 85 is disposed on a surface of the caliper bracket 66*a* inside in the vehicle width direction.

In the embodiment, the pulsar rotor 84 is mounted on a first lateral side (left-hand side) of the wheel 5. The wheel speed sensor 85 is mounted on the caliper bracket 66*a* of, out of the pair of left and right axle support members 66, the axle support member 66 on the left-hand side.

The pulsar rotor 84 includes a plurality of rotor mounting portions 84*a* and a doughnut-shaped plate-like detected portion 84*b*. The rotor mounting portions 84*a* are fastened jointly with the brake disc 68 to the wheel 5 by the bolts 71. The detected portion 84*b* is integrated with the rotor mounting portions 84*a*.

The detected portion 84*b* has a plurality of slits 84*c* each being spaced apart from each other in a circumferential direction.

The wheel speed sensor 85 detects rotation of the pulsar rotor 84.

Figure 4:
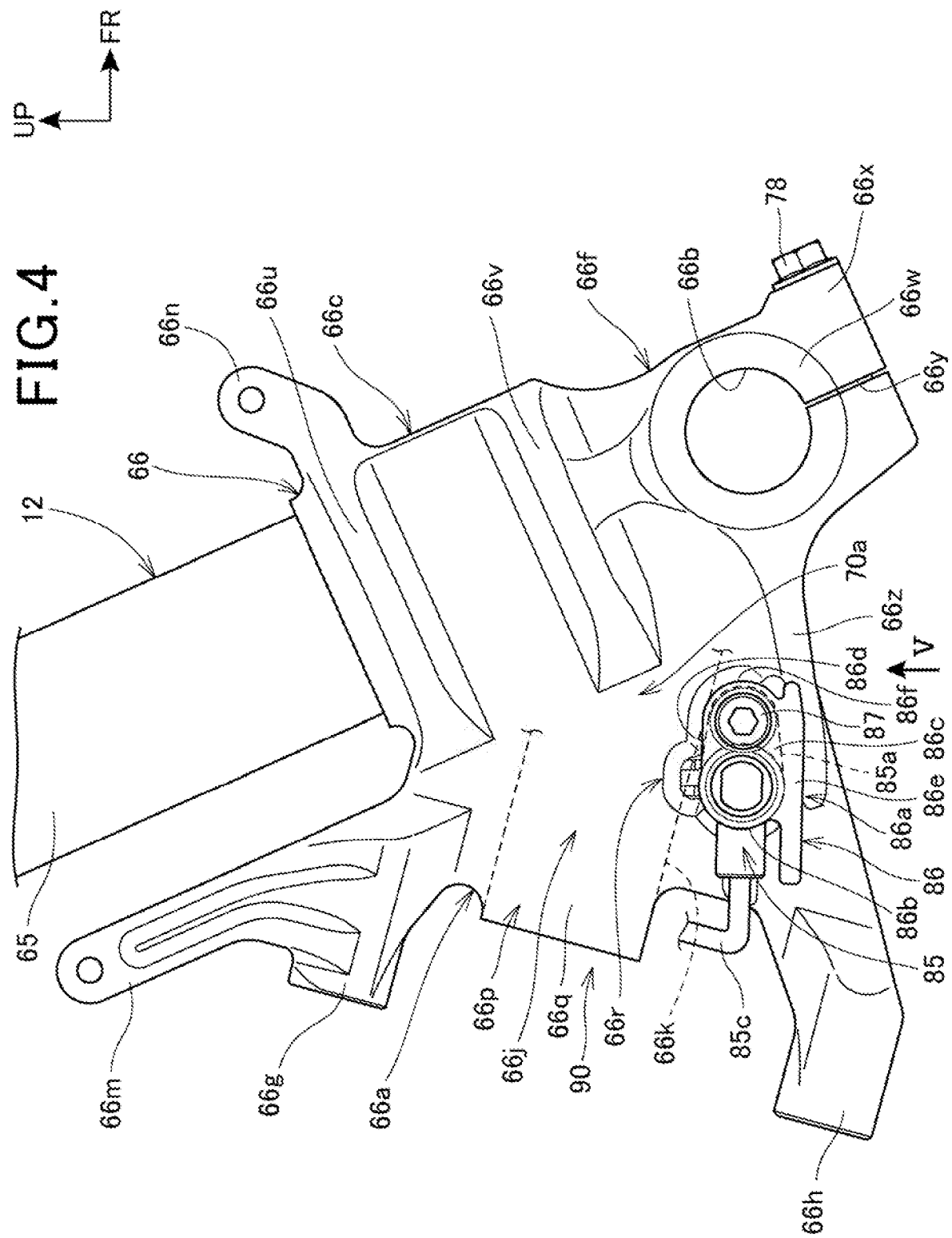
FIG. 4 is a right side elevational view of a front fork lower portion in which an axle support portion is viewed from an inner surface side.
Figure 5:
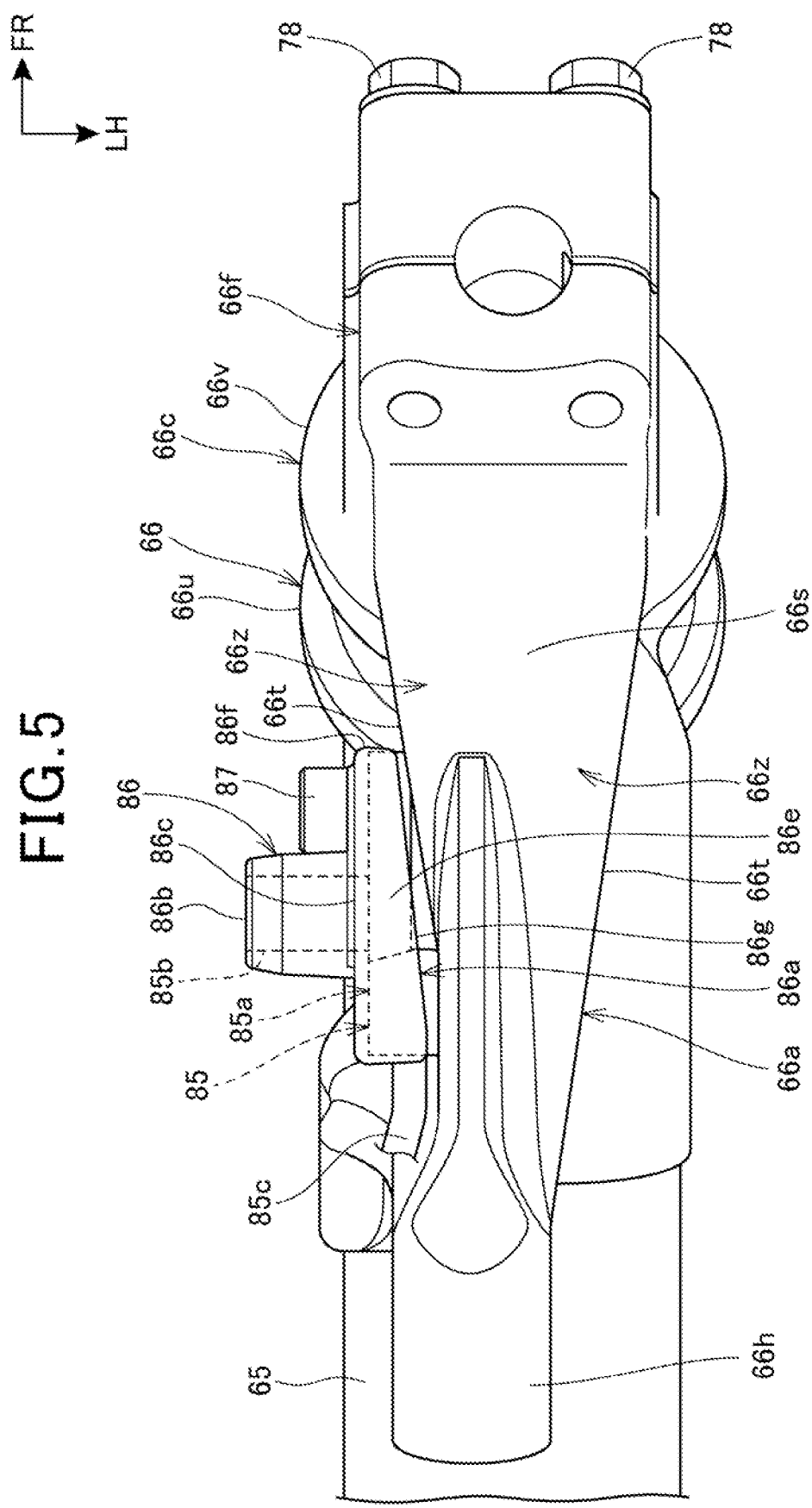
FIG. 5 is a view on arrow V in FIG. 4.

FIG. 4 is a right side elevational view of a front fork lower portion, in which the axle support member 66 is viewed from a side of an inner surface 66*p*. FIG. 5 is a view on arrow V in FIG. 4.

As depicted in FIG. 4, the caliper bracket 66*a* includes a flat portion 66*q* on the inner surface 66*p* which faces the front wheel 2 (see FIG. 3), or more specifically, the wheel 5 (see FIG. 3). A sensor mounting portion 66*r* is provided integrally at a lower portion of the flat portion 66*q*. The sensor mounting portion 66*r* is formed superior to the lower end portion lateral protrusion 66*z* on the inside in the vehicle width direction (on the side of the inner surface 66*p*).

In FIGS. 4 and 5, the wheel speed sensor 85 and a protection cover 86 are mounted on the sensor mounting portion 66*r*. The wheel speed sensor 85 detects rotation of the front wheel 2 (see FIG. 3). The protection cover 86 partly covers the wheel speed sensor 85. The wheel speed sensor 85 and the protection cover 86 are jointly fastened to the sensor mounting portion 66*r* by a bolt 87.

Through the detection of rotation of the front wheel 2 by the wheel speed sensor 85, an electronic control unit (ECU) included in the vehicle body translates a rotational signal output from the wheel speed sensor 85 to a corresponding rotational speed of the front wheel 2, so that the rotational speed is used for control of different parts of the motorcycle 1 (see FIG. 1).

In FIGS. 3 and 4, the pressure tank 66*k* and the wheel speed sensor 85 are disposed in a space 90 which is disposed inferior to the upper caliper support portion 66*g* and superior to the lower caliper support portion 66*h*.

Reference is made to FIG. 5. The left and right lower end portion lateral protrusions 66*z* constitute left and right lateral portions of a bottom portion 66*s* of the caliper bracket 66*a*. Side edges 66*t* of the left and right lower end portion lateral protrusions 66*z* are inclined such that an interval therebetween decreases toward the rear of the vehicle relative to the shaft support main unit portion 66*f*. Specifically, the bottom portion 66*s* of the caliper bracket 66*a* is formed into a triangle in a bottom view.

The provision of the left and right lower end portion lateral protrusions 66*z* enables a boundary portion 70*a* between the caliper bracket 66*a* and the axle support portion 66*c*, in FIG. 4, to be reinforced, and further enables the axle support member 66 to be reinforced.

The wheel speed sensor 85 is disposed inferior to the pressure tank 66*k*. The disposition of the wheel speed sensor 85 facilitates work to be performed on the wheel speed sensor 85 by way of a lower end portion of the caliper bracket 66a, giving an advantage when maintenance is required.

Figure 6:
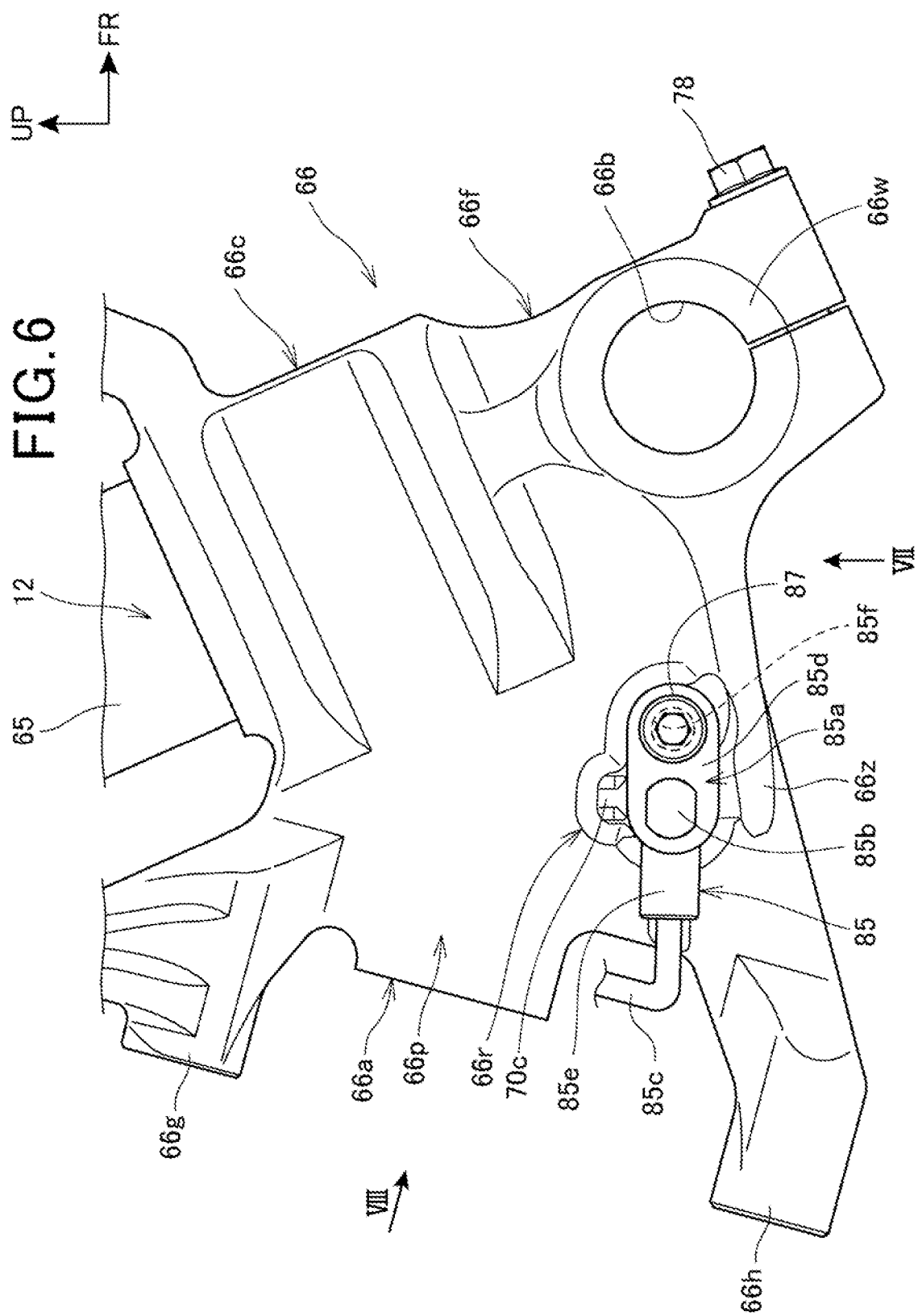
FIG. 6 is a right side elevational view of a condition in which a protection cover has been removed from a condition depicted in FIG. 4.
Figure 7:
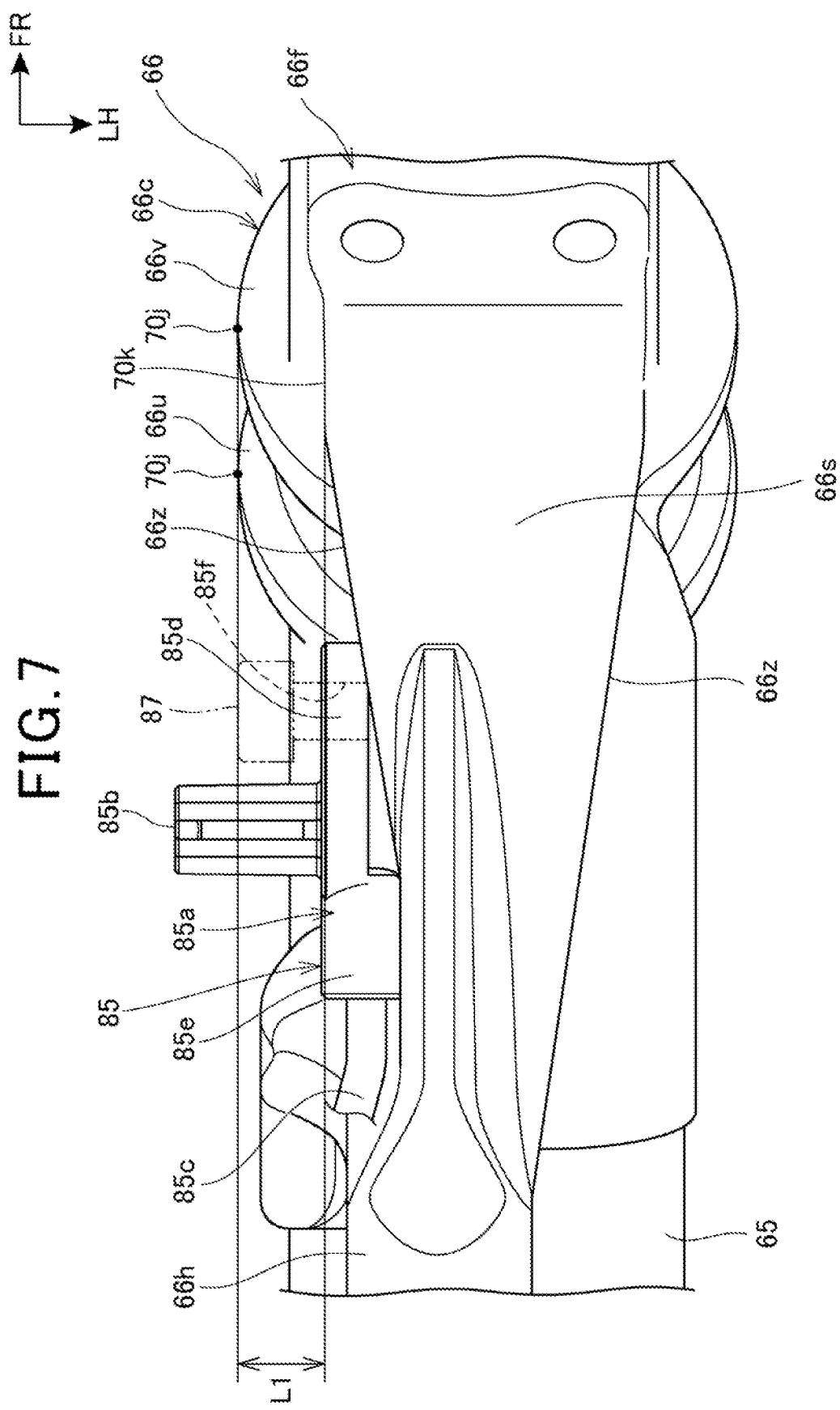
FIG. 7 is a view on arrow VII in FIG. 6.

FIG. 6 is a right side elevational view of a condition in which the protection cover 86 has been removed from the condition depicted in FIG. 4. FIG. 7 is a view on arrow VII in FIG. 6.

In FIGS. 6 and 7, the wheel speed sensor 85 includes a base 85a, a detector 85b, and a cable 85c. The detector 85b protrudes from the base 85a toward the side of the pulsar rotor 84 (see FIG. 3). The cable 85c extends from the base 85a.

The base 85a includes an oblong plate-shaped portion 85d and a cylindrical base end portion 85e. The base end portion 85e is integrally formed with a first end portion of the plate-shaped portion 85d. The plate-shaped portion 85d has a bolt pass-through hole 85f at a portion thereof on a side closer to the axle pass-through hole 66b in the axle support member 66. The bolt 87 is passed through the bolt pass-through hole 85f.

The detector 85b is a columnar portion detecting rotation of the pulsar rotor 84 (see FIG. 3). The detector 85b is disposed, in the plate-shaped portion 85d, at a position further away from the axle pass-through hole 66b than the bolt pass-through hole 85f.

The cable 85c is routed from the base end portion 85e of the base 85a to the front fork 12 and the vehicle body frame 10 (see FIG. 1) before being connected with the ECU disposed in the vehicle body. The foregoing configuration enables a rotation signal of the pulsar rotor 84 detected by the detector 85b to be applied to the ECU.

Reference is made to FIG. 7. A protrusion 70j in each of the upper annular protrusion 66u and the lower annular protrusion 66v of the axle support member 66 protrudes most laterally, by a distance L1 from an inner lateral surface 70k of the shaft support main unit portion 66f. Additionally, the detector 85b of the wheel speed sensor 85 protrudes further inside in the vehicle width direction than the protrusions 70j.

Reference is made to FIGS. 4 and 5. The protection cover 86 covers an area around the wheel speed sensor 85. More specifically, the protection cover 86 integrally includes a base covering portion 86a and a detector covering portion 86b. The base covering portion 86a covers the base 85a of the wheel speed sensor 85. The detector covering portion 86b has a tubular shape and protrudes from the base covering portion 86a to the inside in the vehicle width direction to thereby cover an area around the detector 85b of the wheel speed sensor 85.

The base covering portion 86a includes a lateral covering portion 86c, an upper covering portion 86d, a lower covering portion 86e, and an anterior covering portion 86f.

The lateral covering portion 86c covers the base 85a laterally (from the inside in the vehicle width direction). The upper covering portion 86d extends from an upper edge of the lateral covering portion 86c to the outside in the vehicle width direction (toward the side of the sensor mounting portion 66r) to thereby cover the base 85a from above. The lower covering portion 86e extends from a lower edge of the lateral covering portion 86c to the outside in the vehicle width direction (toward the side of the sensor mounting portion 66r) to thereby cover the base 85a from below. The anterior covering portion 86f extends from an anterior edge of the lateral covering portion 86c to the outside in the vehicle width direction (toward the side of the sensor mounting portion 66r) to thereby cover the base 85a from the front.

In FIG. 5, an outer edge 86g of the lower covering portion 86e is formed to extend along the side edge 66t of the lower end portion lateral protrusion 66z.

The provision of the protection cover 86 enables the wheel speed sensor 85 to be covered from the above, side, below, and the front, so that the wheel speed sensor 85 can be protected.

Figure 8:
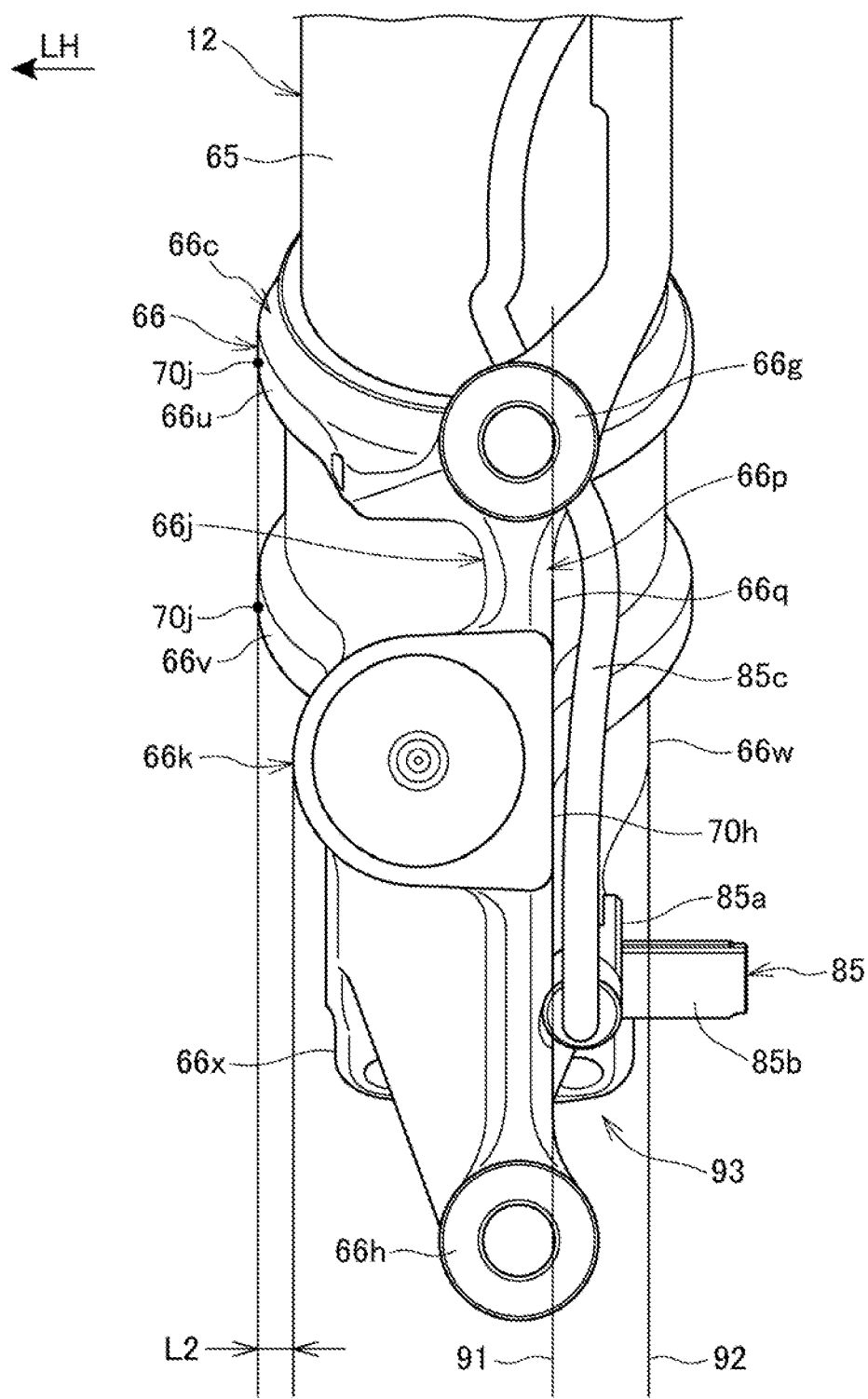
FIG. 8 is a view on arrow VIII in FIG. 6.

FIG. 8 is a view on arrow VIII in FIG. 6.

An inner lateral surface 70h of the pressure tank 66k constitutes a part of the flat portion 66q in the inner surface 66p of the intermediate wall portion 66j. The inner lateral surface 70h is flush with portions of the flat portion 66q other than the inner lateral surface 70h.

The cable 85c of the wheel speed sensor 85 is routed to the upper portion of the front fork 12 by way of a space 93 which is defined between a plane 91 and a plane 92. The plane 91 extends along the flat portion 66q. The plane 92 extends along the annular lateral protrusions 66w.

The routing of the cable 85c of the wheel speed sensor 85 through the space 93 enables the cable 85c to be protected by the axle support member 66 from the front.

The pressure tank 66k is disposed inside the protrusions 70j in the upper annular protrusion 66u and the lower annular protrusion 66v of the axle support member 66 in the vehicle width direction. This configuration enables the axle support portion 66c to protect the pressure tank 66k from the front.

Figure 9:
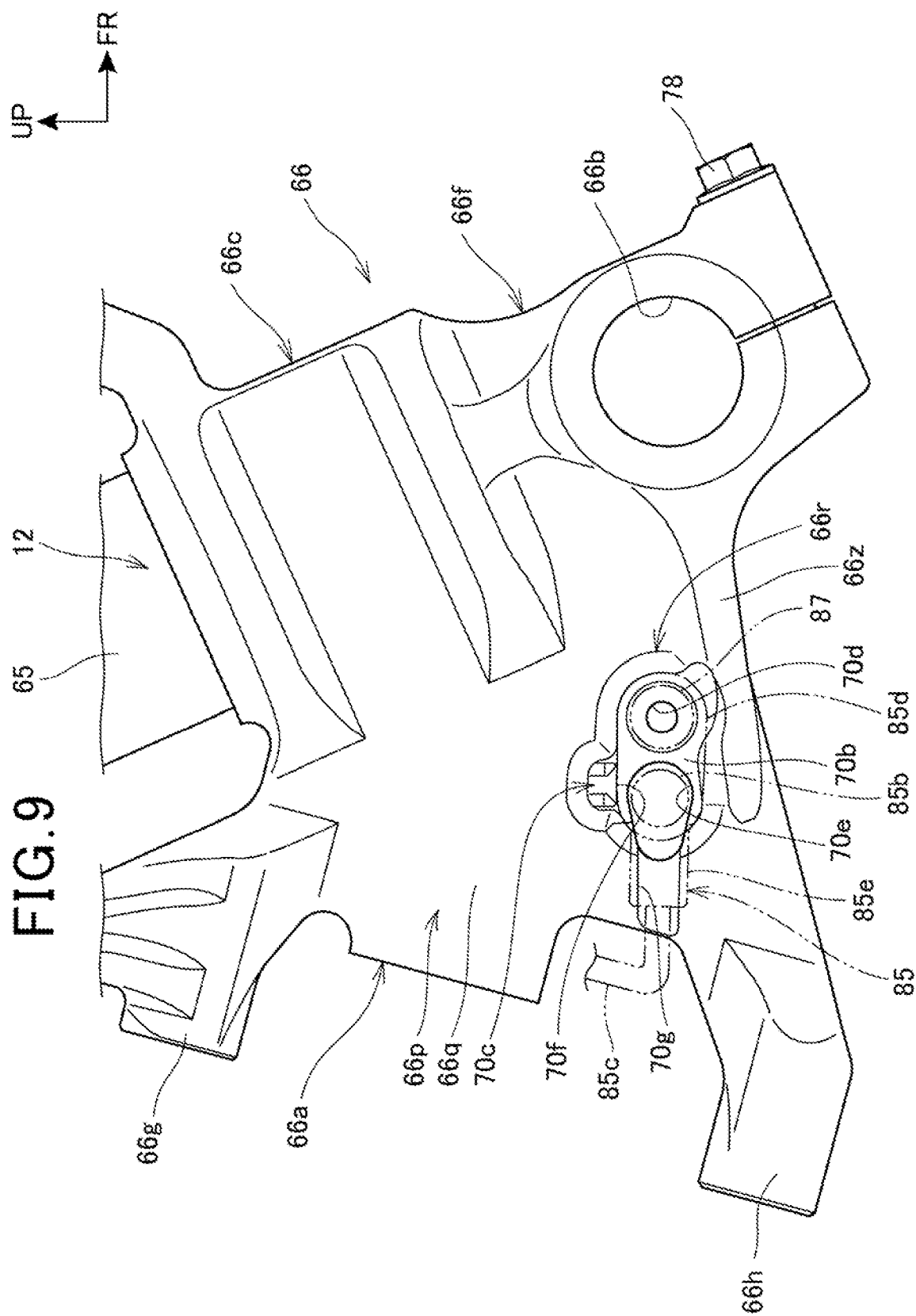
FIG. 9 is a right side elevational view of a condition in which a wheel speed sensor has been removed from a condition depicted in FIG. 6.

FIG. 9 is a right side elevational view of a condition in which the wheel speed sensor 85 has been removed from the condition depicted in FIG. 6.

The sensor mounting portion 66r of the caliper bracket 66a includes a base 70b, a stopper 70c, a threaded hole 70d, and a recess 70e.

Reference is made to FIGS. 6 and 9. The base 70b integrally protrudes from the flat portion 66q of the inner surface 66p to the inside in the vehicle width direction. The plate-shaped portion 85d of the wheel speed sensor 85 has a bottom surface abutting against the base 70b. The stopper 70c is formed integrally with an upper edge of the base 70b. The stopper 70c has a stopper surface 70f formed at a lower end thereof. The plate-shaped portion 85d of the wheel speed sensor 85 has a peripheral surface abutting against the stopper surface 70f. The wheel speed sensor 85 is locked by the stopper surface 70f.

The threaded hole 70d is formed in a front portion of the base 70b. The bolt 87 is threadedly engaged with the threaded hole 70d. The recess 70e is formed in a rear portion of the base 70b. The recess 70e prevents the base end portion 85e of the wheel speed sensor 85 from interfering with the caliper bracket 66a.

A posterior recess 70g is formed in the flat portion 66q of the sensor mounting portion 66r. The posterior recess 70g also prevents the base end portion 85e of the wheel speed sensor 85 from interfering with the caliper bracket 66a.

As described with reference to FIGS. 1, 3, and 4, the motorcycle 1 as a saddle riding vehicle includes the front fork 12 which suspends the front wheel 2 and the front fork 12 represents a compression type and includes the pressure tank 66k disposed at the lower end portion thereof. Additionally, the front fork 12 includes, at the lower end portion thereof, the caliper bracket 66a which supports the brake caliper 69 which constitutes the disc brake 67 and the sensor mounting portion 66r on which the wheel speed sensor 85 is mounted.

The caliper bracket 66a includes the pair of caliper support portions (the upper caliper support portion 66g and the lower caliper support portion 66h). In the vehicle side view, the pressure tank 66k is disposed between the upper caliper support portion 66g and the lower caliper support portion 66h, and the sensor mounting portion 66r is disposed inferior to or superior to the pressure tank 66k.

Through the foregoing configuration, the space 90 between the upper caliper support portion 66g and the lower caliper support portion 66h can effectively be utilized to compactly dispose the pressure tank 66k and the wheel speed sensor 85 and to improve appearance.

As depicted in FIGS. 3 and 4, the caliper bracket 66a is integrally formed with the axle support portion 66c which supports the axle 2a of the front wheel 2. Additionally, the caliper bracket 66a includes the intermediate wall portion 66j as the base portion that extends from the axle support portion 66c and the pair of the upper caliper support portion 66g and the lower caliper support portion 66h that extend from the upper end portion and the lower end portion, respectively, of the intermediate wall portion 66j. The pressure tank 66k and the sensor mounting portion 66r are disposed integrally with the intermediate wall portion 66j.

Through the foregoing configuration, the caliper bracket 66a is integrated with the pressure tank 66k and the sensor mounting portion 66r is centralized, so that a compact layout can be achieved. Additionally, the neat and tidy layout improves appearance, compared with a configuration in which the caliper bracket 66a is separated from the pressure tank 66k.

As depicted in FIG. 4, the sensor mounting portion 66r is formed on the inner surface 66p of the intermediate wall portion 66j on the inside in the vehicle width direction.

Through the foregoing configuration, the wheel speed sensor 85 is not exposed on the outside, so that appearance can improved.

As depicted in FIGS. 2 and 3, the pressure tank 66k forms the cylindrical shape protruding from the intermediate wall portion 66j to the outside in the vehicle width direction.

Through the foregoing configuration, the pressure tank 66k does not protrude to the inside in the vehicle width direction from the intermediate wall portion 66j, so that the space 90 inside the intermediate wall portion 66j in the vehicle width direction can be secured and the wheel speed sensor 85 can be easily disposed.

As depicted in FIG. 3, the wheel speed sensor 85 is disposed inferior to the pressure tank 66k in the vehicle side view.

Through the foregoing configuration, maintenance can be easily performed for the wheel speed sensor 85 through access from below the lower caliper support portion 66h.

Additionally, as depicted in FIG. 4, the wheel speed sensor 85 is mounted to the sensor mounting portion 66r together with the protection cover 86 which serves as a protection member for protecting the wheel speed sensor 85.

Through the foregoing configuration, the wheel speed sensor 85 can be protected by a simple structure and the wheel speed sensor 85 can be protected from chipping and other disturbances.

As depicted in FIGS. 3 and 5, the intermediate wall portion 66j extends from the axle support portion 66c posteriorly in the vehicle body, the intermediate wall portion 66j has, as protrusions, the pair of left and right lower end portion lateral protrusions 66z at a lower end portion thereof, the lower end portion lateral protrusions 66z forming a triangular shape in a bottom view. The wheel speed sensor 85 protrudes further toward the inside in the vehicle width direction relative to the width of the lower end portion lateral protrusions 66z in the bottom view. The protection cover 86 has, as a lower extension, the lower covering portion 86e which extends along the inclination of the side edge 66t of the lower end portion lateral protrusions 66z, at a position inferior to the wheel speed sensor 85.

Through the foregoing configuration, the provision of the pair of left and right lower end portion lateral protrusions 66z enables strength of the intermediate wall portion 66j to be enhanced. Additionally, the lower end portion lateral protrusions 66z which are shaped into a triangle reduces a volume of the lower end portion lateral protrusions 66z, so that an increase in weight can be reduced. Furthermore, the protection cover 86 covers a protruding portion of the wheel speed sensor 85, so that the wheel speed sensor 85 can be protected.

As depicted in FIGS. 3 and 4, the wheel speed sensor 85 is disposed posterior to the axle 2a of the front wheel 2 in the vehicle side view.

Through the foregoing configuration, the wheel speed sensor 85 can be protected from the front by the axle 2a and parts around the axle 2a.

As depicted in FIGS. 4 and 5, the detector 85b of the wheel speed sensor 85 is covered in the detector covering portion 86b as the tubular portion disposed in the protection cover 86, which protects the wheel speed sensor 85.

Through the foregoing configuration, the detector 85b of the wheel speed sensor 85 can be protected by the detector covering portion 86b of the protection cover 86.

As depicted in FIGS. 5 and 7, the bolt 87 as the fastening member for fixing the wheel speed sensor 85 to the sensor mounting portion 66r is disposed anterior to the detector 85b of the wheel speed sensor 85.

Through the foregoing configuration, the detector 85b of the wheel speed sensor 85 can be protected from the front by the bolt 87.

The embodiment of the present invention described above is illustrative only and not limiting, and various changes can be made therein without departing from the spirit or essential characteristics of the present invention.

For example, while the wheel speed sensor 85 has been described in the above-described embodiment to be disposed inferior to the pressure tank 66k in the vehicle side view as depicted in FIG. 4, the wheel speed sensor 85 may be disposed superior to the pressure tank 66k in the vehicle side view.

Additionally, the present invention can be applied to, not only the motorcycle 1, but also any other type of saddle riding vehicles including the motorcycle 1.

DESCRIPTION OF REFERENCE SYMBOLS

1 Motorcycle (saddle riding vehicle)
2 Front wheel
2a Axle
12 Front fork
66a Caliper bracket
66c Axle support portion
66g Upper caliper support portion (caliper support portion)
66h Lower caliper support portion (caliper support portion)
66j Intermediate wall portion (base portion)
66k Pressure tank
66p Inner surface (surface)
66r Sensor mounting portion
66t Side edge of the lower end portion lateral protrusion 66z Lower end portion lateral protrusion (protrusion)
67 Disc brake
69 Brake caliper (caliper)
85 Wheel speed sensor
85b Detector
86 Protection cover (protection member)
86b Detector covering portion (tubular portion)
86e Lower covering portion (lower extension)
87 Bolt (fastening member)

The invention claimed is:

1. A front fork lower portion structure of a saddle riding vehicle, the saddle riding vehicle including a front fork of a compression type for suspending a front wheel, the front fork lower portion structure comprising:
   a pressure tank included in the front fork;
   a caliper bracket, disposed at a lower end portion of the front fork, for supporting a caliper that constitutes a disc brake; and
   a sensor mounting portion that is disposed at the lower end portion of the front fork and to which a wheel speed sensor is mounted, wherein
   the caliper bracket includes a pair of upper and lower caliper support portions,
   the pressure tank is disposed between the upper and lower caliper support portions in a vehicle side view, and
   the sensor mounting portion is disposed inferior to or superior to the pressure tank.

2. The front fork lower portion structure of a saddle riding vehicle according to claim 1, wherein
   the caliper bracket is integrally formed with an axle support portion that supports an axle of the front wheel,
   the caliper bracket includes a base portion that extends from the axle support portion and the upper and lower caliper support portions that extend from an upper end portion and a lower end portion, respectively, of the base portion, and
   the pressure tank and the sensor mounting portion are disposed integrally with the base portion.

3. The front fork lower portion structure of a saddle riding vehicle according to claim 2, wherein the sensor mounting portion is formed on a surface of the base portion on an inside in a vehicle width direction.

4. The front fork lower portion structure of a saddle riding vehicle according to claim 2, wherein the pressure tank forms a cylindrical shape protruding from the base portion outside in the vehicle width direction.

5. The front fork lower portion structure of a saddle riding vehicle according to claim 2, wherein the wheel speed sensor is disposed inferior to the pressure tank in the vehicle side view.

6. The front fork lower portion structure of a saddle riding vehicle according to claim 2, wherein the wheel speed sensor is mounted to the sensor mounting portion together with a protection member that protects the wheel speed sensor.

7. The front fork lower portion structure of a saddle riding vehicle according to claim 6, wherein
   the base portion extends from the axle support portion posteriorly in a vehicle body,
   the base portion has a pair of left and right protrusions at lower end portions thereof, the protrusions forming a triangular shape in a bottom view,
   the wheel speed sensor protrudes further toward the inside in the vehicle width direction relative to a width of the protrusions in the bottom view, and
   the protection member has a lower extension that extends along an inclination of a side edge of the protrusion at a position inferior to the wheel speed sensor.

8. The front fork lower portion structure of a saddle riding vehicle according to claim 1, wherein the wheel speed sensor is disposed posterior to the axle of the front wheel in the vehicle side view.

9. The front fork lower portion structure of a saddle riding vehicle according to claim 1, wherein the wheel speed sensor includes a detector that is covered in a tubular portion of the protection member that protects the wheel speed sensor.

10. The front fork lower portion structure of a saddle riding vehicle according to claim 9, wherein a fastening member is disposed anterior to the detector of the wheel speed sensor, the fastening member fixing the wheel speed sensor to the sensor mounting portion.

\* \* \* \* \*